United States Patent [19]

Nakamura et al.

[11] Patent Number: 5,287,343
[45] Date of Patent: Feb. 15, 1994

[54] NETWORK ADMINISTRATION SYSTEM

[75] Inventors: Yutaka Nakamura; Tadashi Satake; Takashi Suzuki; Yoko Ishida, all of Kadoma, Japan

[73] Assignee: Matsushita Electric Works, Ltd., Osaka, Japan

[21] Appl. No.: 840,279

[22] Filed: Feb. 24, 1992

[30] Foreign Application Priority Data

Feb. 25, 1991 [JP] Japan .................... 3-030448
Nov. 15, 1991 [JP] Japan .................... 3-300871

[51] Int. Cl.⁵ .................... H04J 3/14; H04B 17/00
[52] U.S. Cl. .................... 370/13.1; 370/14; 370/94.1; 370/94.3; 375/3; 375/3.1; 371/20.2; 340/825.02
[58] Field of Search .................... 370/13, 13.1, 14, 15, 370/60, 85.1, 85.2, 85.3, 85.4, 85.5, 85.13, 94.1, 94.3, 97, 85.8; 375/3, 3.1, 4, 10; 340/825.02, 825.06, 825.07, 825.16, 825.36, 825.08, 825.54; 379/4, 5, 9, 15, 18, 22, 26; 455/7, 9, 54.2, 67.1, 67.7, 69; 371/15.1, 16.5, 20.1, 20.2

[56] References Cited

U.S. PATENT DOCUMENTS

| | | | |
|---|---|---|---|
| 4,317,010 | 2/1982 | Fillot | 370/13.1 |
| 4,334,303 | 6/1982 | Bertin et al. | 370/13.1 |
| 4,637,013 | 1/1987 | Nakamura | 370/85.4 |
| 4,663,748 | 5/1987 | Karbowiak et al. | 370/85.4 |
| 4,837,788 | 6/1989 | Bird | 375/3 |
| 4,896,315 | 1/1990 | Felker et al. | 370/17 |
| 4,980,887 | 12/1990 | Dively et al. | 370/13.1 |
| 5,010,544 | 4/1991 | Chang et al. | 370/13.1 |
| 5,077,554 | 12/1991 | Orita et al. | 340/825.02 |
| 5,161,192 | 11/1992 | Carter et al. | 375/3 |

*Primary Examiner*—Douglas W. Olms
*Assistant Examiner*—Alpus H. Hsu
*Attorney, Agent, or Firm*—Leydig, Voit & Mayer

[57] ABSTRACT

A network administration system includes a network of a plurality of cascade connected repeaters for functional terminal units, and an administrative terminal connected through a transmission path to the network for administrating the network of the repeaters and terminal units, the system being arranged for transmitting from said administrative terminal a command packet to the network for recognition of connecting arrangement between the respective repeaters and terminal units, returning from the network a return packet to the administrative terminal in response to the command packet, and analyzing in the administrative terminal the return packet for automatically recognizing the connecting arrangement in the cascade connection of the repeaters and terminal units included within the network and precisely locating one of the repeaters and one of its connecting ports to which one of the terminal units involving a trouble is connected.

6 Claims, 18 Drawing Sheets

FIG. 20

| | | |
|---|---|---|
| PORT1 | FOR HUB | ------ ⋮ ------ |
| | FOR NETWORK ADMINISTRATING DEVICE | ------ |
| | THE OTHER | |
| PORT2 | FOR HUB | HUB1 ADDRESS ------ ⋮ ------ |
| | FOR NETWORK ADMINISTRATING DEVICE | NETWORK ADMINIST. DEVICE1 ADDRESS |
| | THE OTHER | |
| ⋮ | | |
| | FOR HUB | ------ ⋮ ------ |
| | FOR NETWORK ADMINISTRATING DEVICE | ------ |
| | THE OTHER | |

NETWORK ADMINISTRATION SYSTEM

BACKGROUND OF THE INVENTION

This invention relates to a system for executing a network administration of such repeaters as hubs in a cascade connection.

DESCRIPTION OF RELATED ART

The network administration system of the kind referred to is provided for transmitting an administrative command packet from an administrative terminal of a network under administration to such repeaters as hubs being administrated. The hub which has received the administrative command packet analyzes a command in the packet and returns a return packet corresponding to the command to the administrative terminal. The administrative terminal which has received the return packet analyzes received information of the return packet to determine an address, state of respective ports and so on of the hub, and houses the information in a table or the like. Here, an administrator of the network operates the administrative terminal to have the housed information displayed on a monitor screen, for discovering any abnormality of the hub from the information displayed and executing a removal or the like operation of any trouble causing such abnormality. Arrangements capable of executing the network administration system of the kind referred to, are exemplified in U.S. Pat. No. 4,637,013 to Y. Nakamura and U.S. Pat. No. 4,896,315 to M. A. Felker et al.

In recently utilized networks, on the other hand, there has been practiced a so-called cascade connection in which two child repeaters, for example, are connected to a parent repeater and at least two grandchild repeaters are connected at least to one of the child repeaters. However, when the foregoing known administration system is applied to the administration of such network that involves the cascade connection, there arises such a drawback as follows. That is, even the child or grandchild repeater of the cascade connection in the network is subjected in the administrative terminal to the same communication steps in one versus one relationship as that for the parent repeater. In the administrative terminal, therefore, the cascade-connected repeaters are to be all recognized equally to repeaters in a bus type connection such as that which has been partly disclosed in Felker et al. The recognition and administration of the respective repeaters will be carried out with contents far from practical connection type, whereby there will be caused a problem that, when any trouble has happened within the network, it will require much time for locating a part where the trouble has occured so as to remarkably delay elimination of the trouble.

SUMMARY OF THE INVENTION

A primary object of the present invention is, therefore, to provide a network administration system which is capable of reliably precisely recognizing the cascade connection arrangement of the repeaters included in a network, and of quickly realizing a measure for any trouble which has occurred in the network with any one of the repeaters or its connecting ports.

Another object of the present invention is to provide a network administration system which can be adapted to an automated recognition of the cascade connection arrangement of the repeaters included in the network.

Still another object of the present invention is to provide a network administration system which has an effective address memory arrangement with respect to a network in which the repeaters are cascade-connected using a twisted pair line.

According to the present invention, these objects can be realized by means of a network administration system comprising a network including a plurality of repeaters in a cascade connection, an administrative terminal connected to the topmost one of the repeaters in the cascade connection, means for forming a command packet for recognizing actual connection arrangement of the repeaters, means provided in relationship to the repeaters for transmitting a return packet on the basis of the command packet received at the repeaters, and means provided in relationship to the administrative terminal for analyzing the return packet.

Other objects and advantages of the present invention shall be made clear in following description of the invention detailed with reference to preferred embodiments shown in accompanying drawings.

BRIEF EXPLANATION OF THE DRAWINGS

FIG. 20 is an explanatory view for an arrangement of a memory in the system of FIG. 19;

Figure 1:
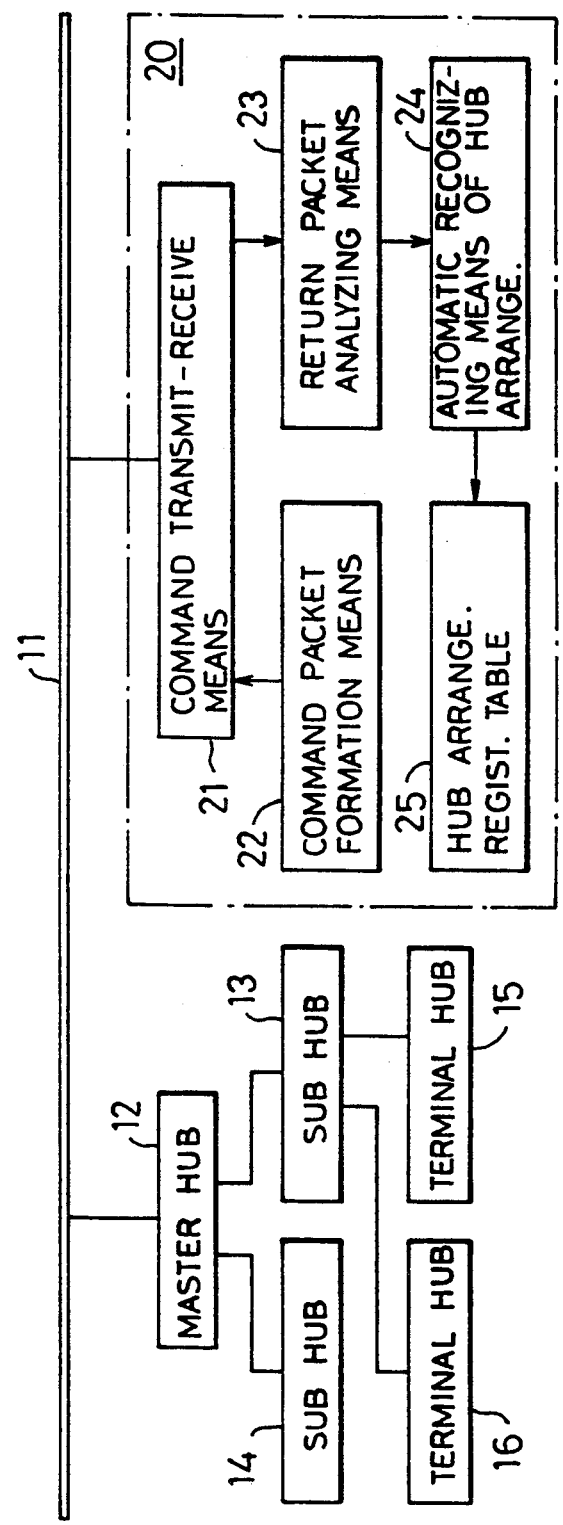
FIG. 1 shows in a schematic block diagram an embodiment of the network administration system according to the present invention.

While the present invention shall now be described with reference to the embodiments shown in the drawings, it will be appreciated that the intention is not to limit the invention only to these embodiments but to include all alterations, modifications and equivalent arrangements possible within the scope of appended claims.

DETAILED DESCRIPTION OF PREFERRED EMBODIMENTS

Referring to FIG. 1 showing an embodiment of the network administration system according to the present invention, there are connected to a transmission path 11 of the system many repeaters such as hubs 12 to 16 in a cascade connection and an administrative terminal 20. In these hubs, a parent or master hub 12 is connected at its upper port to the transmission path 11. Further child or sub hubs 13 and 14 are connected to a lower port of the master hub 12 and grandchild or terminal hubs 15 and 16 are connected to sub hub 13, upon which, while not shown, a terminal device may be connected to lower ports of the respective sub hub 14 and terminal hubs 15 and 16.

In the administrative terminal 20, there are included a command transmitting and receiving means 21, a command packet forming means 22, a return packet analyzing means 23, an automatic recognizing means 24 for the connection arrangement of the repeaters which are the hubs here, and a registering table 25 for the hub connection arrangement. In the command packet forming means 22, a command for the network administration is formed and is then provided to the command transmitting and receiving means 21 where the command is made to be transmitted to the transmission path 11 and any return packet from the transmission path 11 is received and provided to the return packet analyzing means 23. An analyzation result at the return packet analyzing means 23 is input into the automatic recognizing means 24, where the connection arrangement of the hubs cascade-connected is automatically recognized and is provided to the registering table 25, so that the connection arrangement of the hubs will be registered in the registering table 25.

Figure 2:
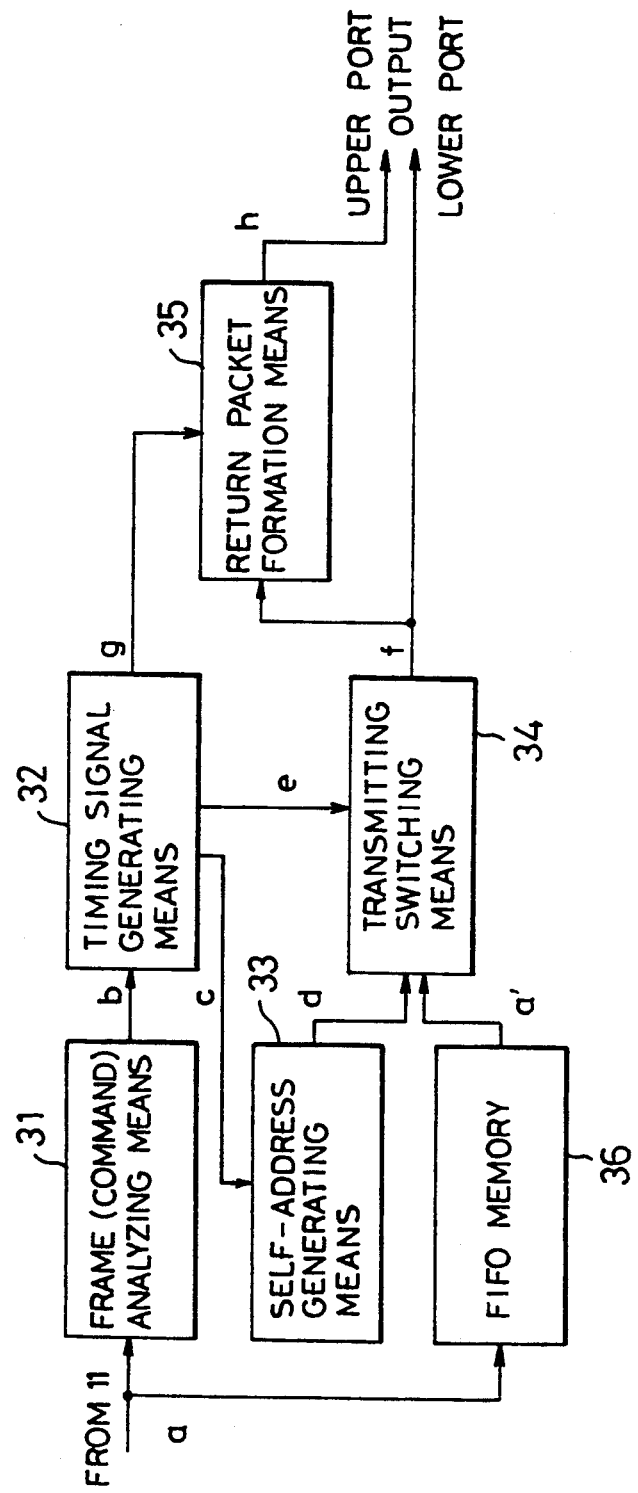
FIG. 2 shows in a block diagram a hub employed as the repeater in the system of FIG. 1.

Referring now to FIG. 2, there are shown details of the hub employed as the repeater in the present invention. A command packet a from the administrative terminal 20 is input to the hub through the transmission path 11. More practically, this command packet a is sent to a frame analyzing means 31 where, when this input packet is of a network administrative command, the last MAC address code of data forming such command is searched and provided to a timing signal generating means 32. The particular MAC address is an address for a medium access control. The timing signal generating means 32 provides a control signal c to a self-address generating means 33 in response to a pulse b from the frame analyzing means 31, and a MAC address code d is generated by the self-address generating means 33. From the timing signal generating means, on the other hand, there is provided a switching signal e to a transmission switching means 34 to which the MAC address code d is also sent. The MAC address code d is made sendable from the transmission switching means 34 to a return packet forming means 35, upon which the MAC address code is provided to a data portion of a packet f. Further to the transmission switching means 34, there is provided a compensation signal a' for a time lag due to a required time for the analyzation at the frame analyzing means 31, from a FIFO memory 36 to which the command packet a is being directly input. In addition, a timing signal g is provided from the timing signal generating means 32 to the return packet forming means 35, and a return packet h including a set address to be sent to the administrative terminal 20 is provided from the return packet forming means 35 to the upper port. When the packet to the hub is an ordinary one, the transmission switching means 34 is not operated to be switched so that the packet f from this transmission switching means 34 will be sent intact to the lower port.

Figure 3:
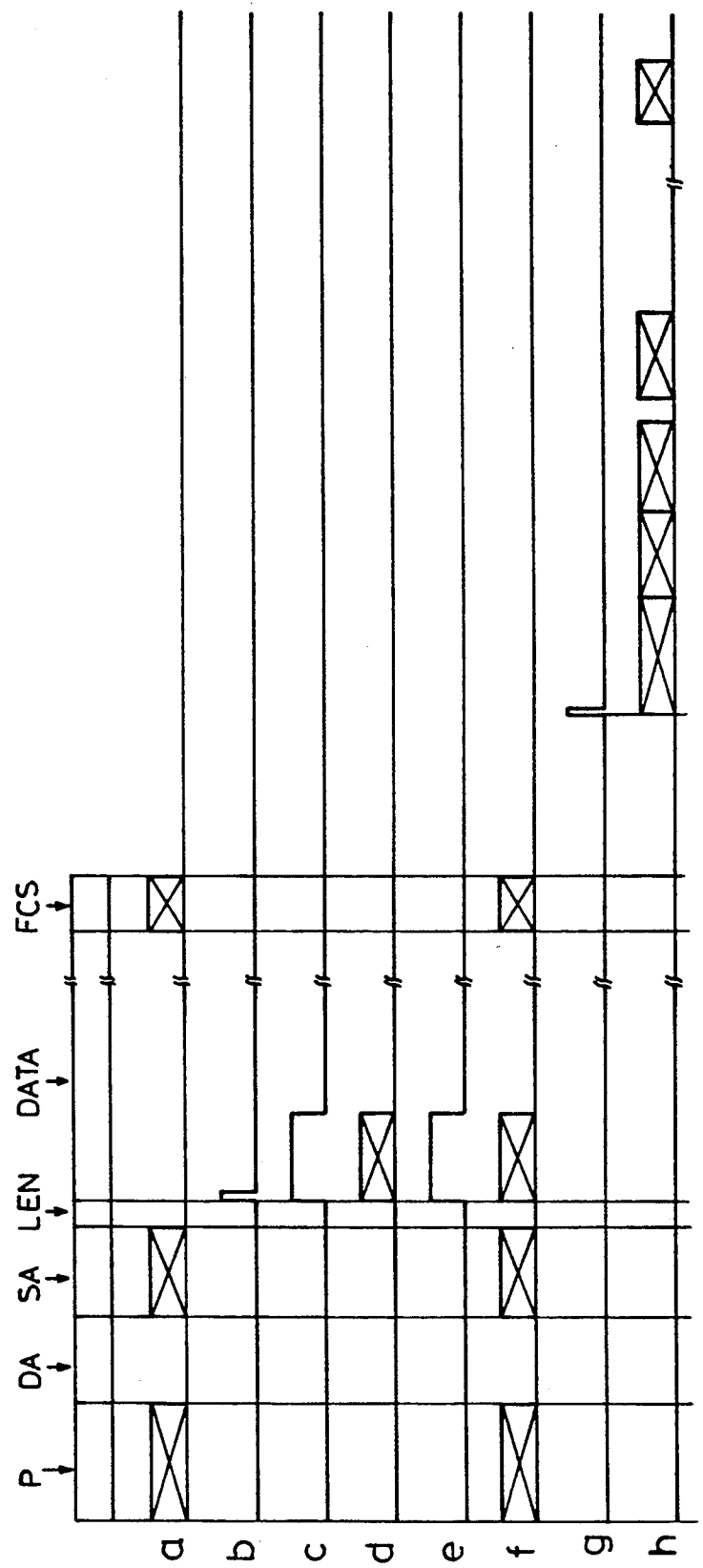
FIG. 3 shows operational wave forms at the hub in the system of FIG. 1.

Signal wave forms at respective parts in the hub shown in FIG. 2 are as shown in FIG. 3 and, when the command packet a constitutes the network administrative command as has been partly referred to, the pulse b is output from the frame analyzing means 23. With this pulse b, the control signal c is output from the timing signal generating means 32 to the self-address generating means 33 and, in response to this control signal c, the MAC address code d is output from the self-address generating means 33. From the timing signal generating means 32, the switching signal e is provided to the transmission switching means 34 and, with this switching signal e, the switching operation is carried out at the transmission switching means 34 to have the packet f transmitted. Further, from the timing signal generating means 32 to the return packet forming means 35, the timing signal g is provided to have the return packet h provided from the return packet forming means 35 to the upper port in response to this signal g, as will be readily appreciated. At the top of FIG. 3, by the way, a command packet constitution for one frame is shown concurrently, in which P represents a preamble, DA represents a direction address, SA denotes a sender address, LEN denotes the length of the data part, DATA is the data part, and FCS denotes a frame check sequence.

Figure 4:
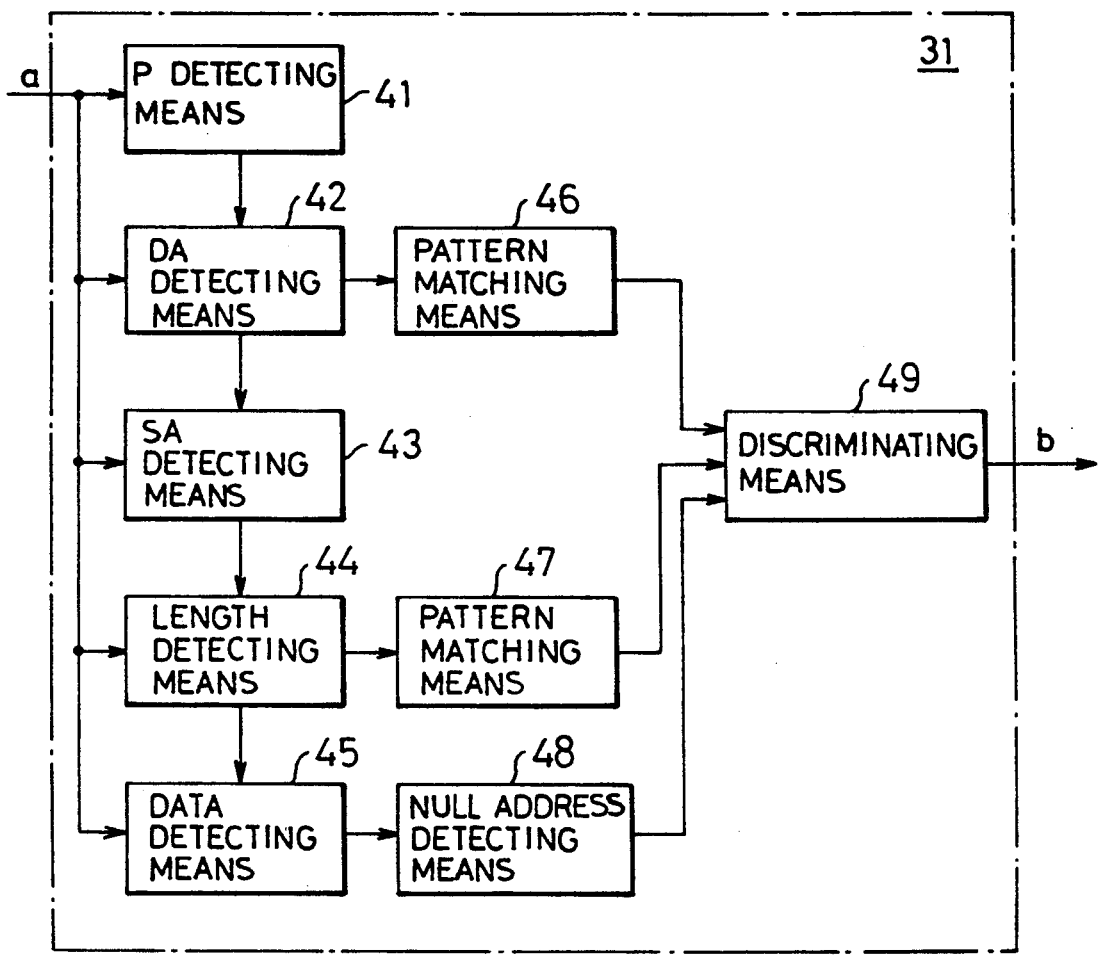
FIG. 4 shows in a block diagram a frame analyzing means of the hub in the system of FIG. 1.

Further, the foregoing frame analyzing means 31 may be formed as shown in FIG. 4 in practice. That is, at a P detecting means 41, the preamble P of the command packet a is detected, an end of this preamble P is provided to a DA detecting means 42 where the direction address is detected, and an end of thus detected address is sent to an SA detecting means 43. The sender address is detected at this SA detecting means 43, an end of this sender address is sent to the LEN detecting means 44 to detect the length of the data part, and an end of the thus detected length is provided to a DATA detecting means 45 where the data part of the packet is detected. A detection output of this means 45 is sent to a null address detecting means 48, where a termination of the MAC address code of the data part is searched, a result of this search is sent to a discriminating means 49 to which a result of comparison of the data with command patterns at a pair of pattern matching means 46 and 47 respectively connected to each of the DA detecting means 42 and LEN detecting means 44 is also provided. Thus, the discriminating means 49 discriminates whether or not the packet is of the network administrative command so that, when the search output of the null address detecting means 48 is also of the network administrative command, there is provided the pulse signal b as an output of the frame analyzing means 31.

Figure 5:
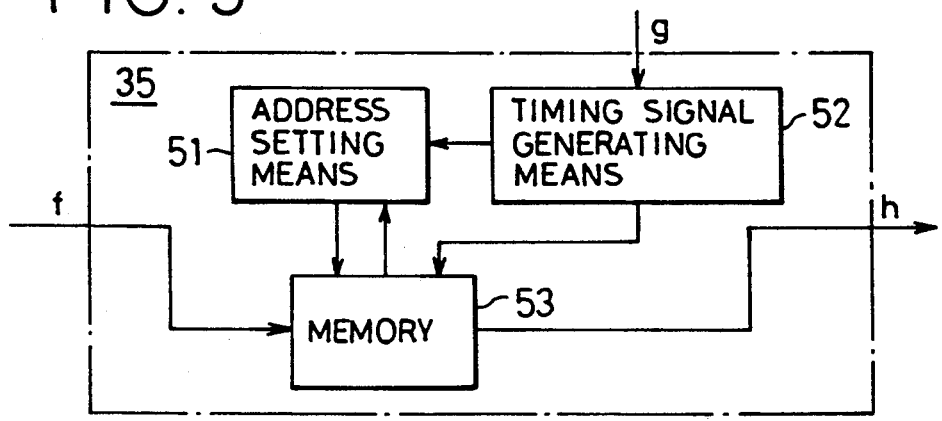
FIG. 5 shows in a block diagram a return packet transmitting means of the hub in the system of FIG. 1.

Further, the return packet forming means 35 may be constituted practically as shown in FIG. 5. That is, this return packet forming means 35 comprises a direction address setting means 51, a memory 53 and a timing signal generating means 52. In the present instance, a starting instruction is provided from the timing signal generating means 52 to the direction address setting means 51, a sending instruction is provided from the direction address setting means 51 to the memory 53, and the address code of the administrative terminal 20 written in the sender address SA is copied by the direction address DA.

Figure 6:
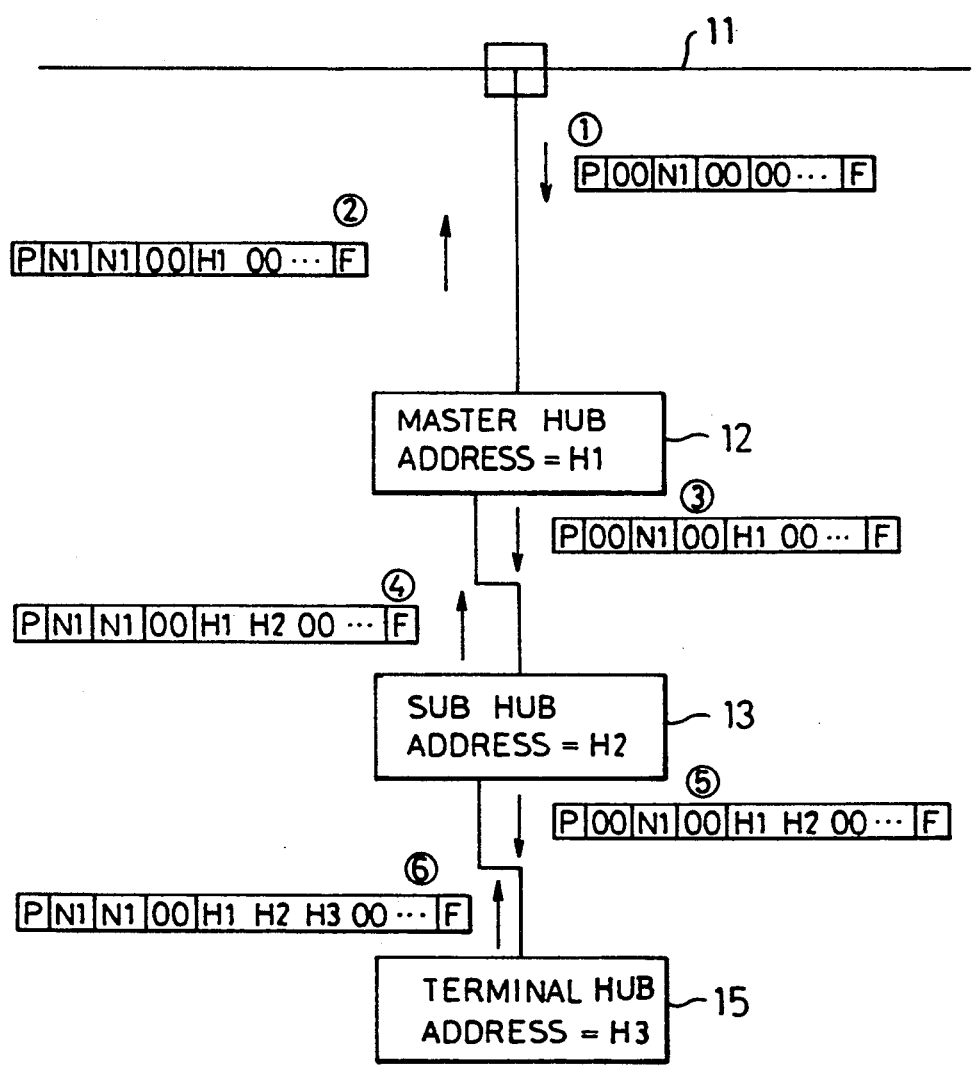
FIG. 6 is an explanatory view for a practical administrating aspect of the system shown in FIG. 1.

Next, the operation in an event where the repeaters, or the hubs 12-16 here, are arranged in such cascade connection as in FIG. 1 shall be referred to with reference to FIG. 6. Now, the administrative terminal 20 sends an automatically recognizing command packet (1) in which the sender address SA is set to be an address (=N1) and all other to be "0". The master hub 12 which has received this packet (1) recognizes that the packet is the automatically recognizing command in view that the direction address is "0" in all bits, sets its own address (=H1) of the master hub in the data part DATA of the packet, and sends an automatically recognizing command packet (3) to other ports than that which has received the packet (1). To the receiving port, further, a packet in which the direction address DA is set to be the address (=N1) of the administrative terminal 20 is sent as a return packet (2). Next, the sub hub 13 which has received the automatically recognizing command packet (3) recognizes it as the automatically recognizing command packet in view that its direction address DA is "0" in all bits, sets its own address (=H2) of the sub hub in the data part DATA and sends the automatically recognizing command to all other ports other than that which has received the packet (3). To the particular receiving port, a packet in which the direction address DA is set to be the address (=N1) of the administrative terminal 20 is sent as a return packet (4). On the other hand, the same operation as in the above is carried out with respect to such terminal hub of lower stage than the sub hub 13 as the terminal hub 15, and eventually a return packet (6) is returned from the terminal hub 15.

Figure 7:
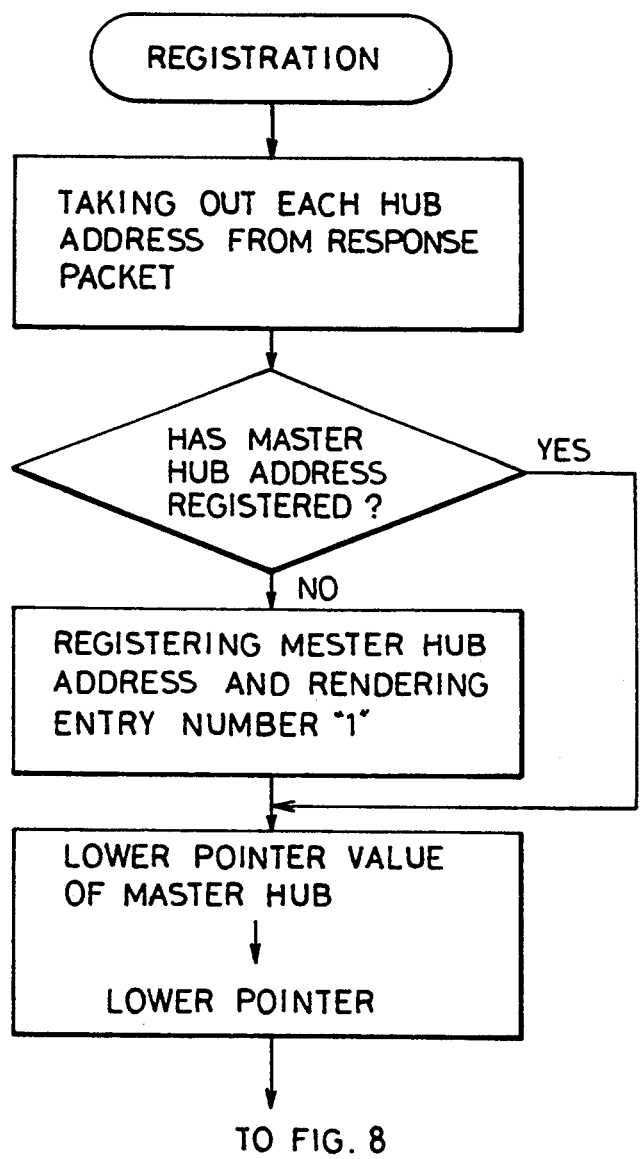
FIG. 7 is a flow chart of a registration operation of a parent or master hub in the system of FIG. 1.
Figure 8:
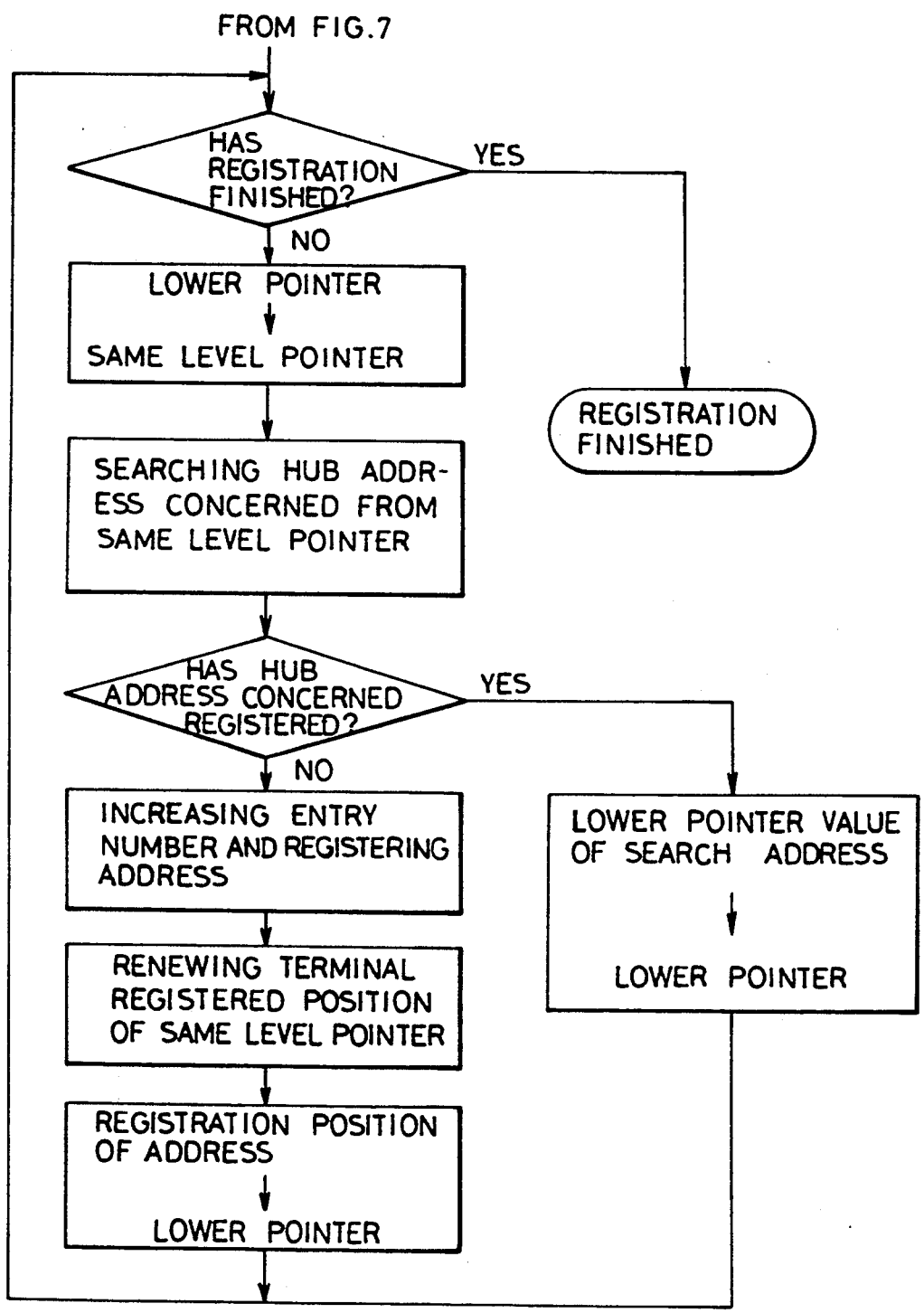
FIG. 8 is a flow chart of a registration operation of a lower positioned hub in the cascade connection in the system of FIG. 1.

In the administrative terminal 20 which has received the return packet (6) here, the cascade connection arrangement of the respective hubs 12-16 connected through the transmission path 11 to the registering table 25 in accordance with a flow chart shown in FIGS. 7 and 8, a constitution example of the registering table 25 upon which is shown in a following TABLE I while a practical example of the registration in the table 25 is shown in further TABLE II. In TABLE I, the same level pointer will be the one which checks the information from the hub or hubs disposed at the same level in the cascade connection arrangement while a lower level point will be the one which points the information of the hub or hubs at a lower stage connection than the one in the above which is at the same level. Here, the value "0" denotes the absence of any hub at the last registered position of the check with respect to the hub or hubs at the same level or at a lower level. Since in the data part of the return packet the hub addresses are set in accordance with the order of such cascade connection arrangement as shown in FIG. 1 with the master hub 12 positioned at the top, it is possible to form a chain of the cascade on the registering table.

TABLE I

| Entry Number | | | |
|---|---|---|---|
| 0 | Address of Hub | The Same Level Pointer | Lower Level Pointer |
| 1 | Address of Hub | The Same Level Pointer | Lower Level Pointer |

↓ ↓ ↓

TABLE II

5

| | | | | |
|---|---|---|---|---|
| 0 | Master Hub Address | = 'H1' | 0 | 1 |
| 1 | Sub Hub Address | = 'H2' | 2 | 3 |
| 2 | Sub Hub Address | = 'H4' | 0 | 0 |
| 3 | Terminal Hub Address | = 'H3' | 4 | 0 |
| 4 | Terminal HubAddress | = 'H5' | 0 | 0 |

↓

In the foregoing network administration system according to the present invention, the system can effectively cope with a case where the return packets are returned at random from the many hubs cascade-connected and, since the command packet shifts from the upper level hub to the lower level hub, the cascade connection arrangement of the hubs can be recognized in conformity with the practical connection arrangement. Further, the cascade connection arrangement can be housed at a smaller capacity and a signal processing on the hub side can be made easier, so that required hardware can be simplified and its compactness will be also realizable.

Figure 9:
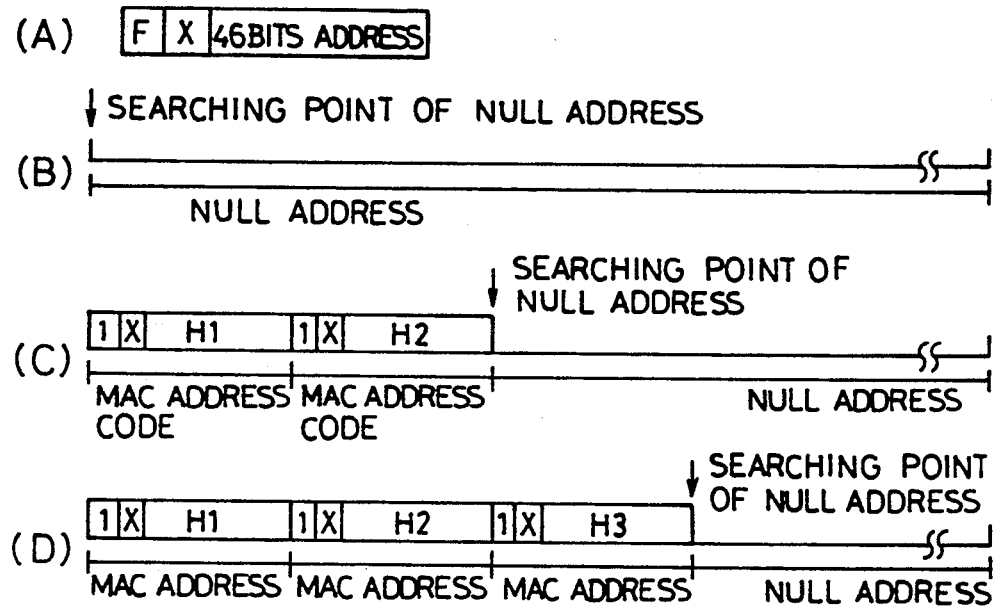
FIG. 9 is an explanatory view for a searching operation with respect to a null address in the system of FIG. 1.
Figure 10:
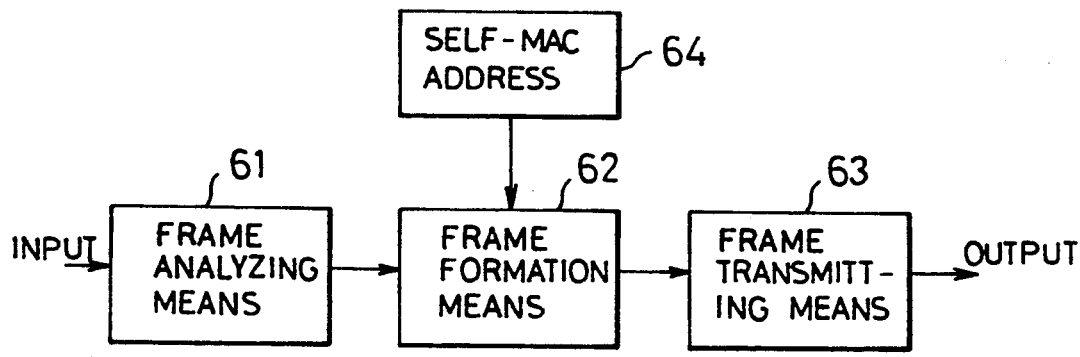
FIG. 10 is a block diagram showing a repeater employed in another working aspect of the network administration system according to the present invention.

Further, the searching operation for the null address shall be elucidated with reference to FIG. 9. In the drawing, (A) denotes an arrangement of the MAC address the whole of which is of 48 bits, while in substance the address is of 46 bits since first and second bits are employed with specific meanings assigned thereto. Thus, the first bit is used as a flag, so as to render the searching simplified. When this flag is "0", the null address is meant, representing that any following MAC address is absent, but the flag made "1" denotes that following MAC address code is present. "X" of the second bit may either be "1" or "0". In an event when corresponding hub address is set in the data part DATA of the packet, "0" for 2 bytes (i.e., 16 bits) are made to be a delimiter, and the address is set at a portion after the delimiter and searched to be "0". When such "0" portion cannot be searched, on the other hand, the read is skipped over a certain number of bits corresponding to the size of the address, and the same processing is carried out. The administrative terminal 20 transmits a command packet in which the address "N1" of the terminal itself is set at the sender address SA, a network administration command "0" is set at the direction address DA and data part length LEN, and null data "0" are set at the data part DATA. While in this case the null data "0" are set at the direction address DA and data part length LEN, this is an example of the network administration command, as will be appreciated.

(B) in FIG. 9 shows an example of the packet first coming from the administrative terminal 20, in which the data part is shown with null data of all "0", and the searching point for the null data is made to be the first portion of the data part as shown in the drawing. (C) in FIG. 9 is an example in which the MAC address codes of H1 and H2 are already written and, when their flag is "1", the searching point for the null address will be as shown in the drawing. Further, (D) in FIG. 9 is an example in which the MAC address codes of H1, H2 and H3 are already written and, when their flag is "1", the searching point for the null address will be as shown, as will be readily appreciated.

Figure 11:
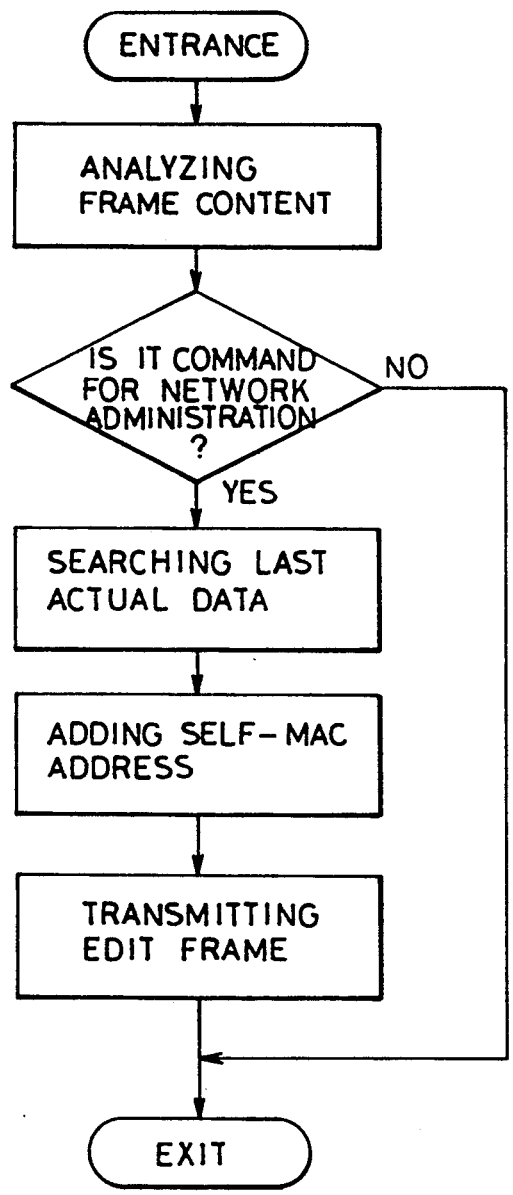
FIG. 11 is a flow chart of a registration operation in the repeater of FIG. 10.
Figure 12:
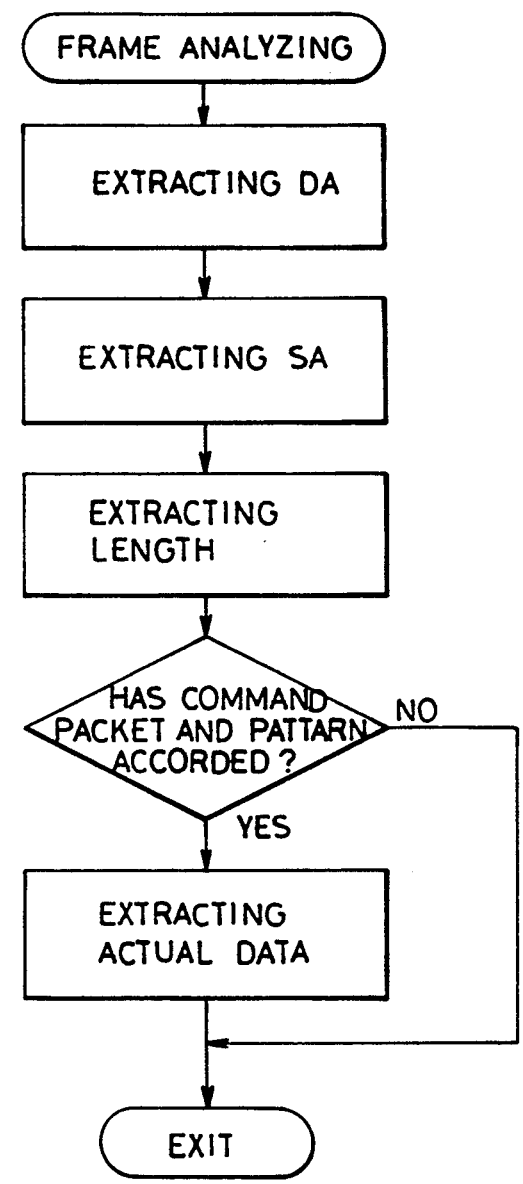
FIG. 12 is a flow chart of a processing operation at a frame analyzing means of the repeater of FIG. 10.

In another working aspect of the foregoing embodiment of the network administration system according to the present invention, an input of the command packet into the repeaters, that is, the hubs here, causes a descrimination whether or not this packet is of the network administration command. In the present instance, a terminating part of the MAC address at the data part of the administration command is searched at the frame analyzing means 61, the MAC address of the hub itself is sent from a self-MAC address transmitting means 64 to a frame forming means 62 and is added to the terminating part of the practical data, and a frame generated can be transmitted through a frame transmitting means 63. A practical operation of this working aspect in this case is carried out along a flow chart of FIG. 11, and the frame analyzing at the frame analyzing means 61 may be executed, more specifically, along such a flow chart as in FIG. 12.

Figure 13:
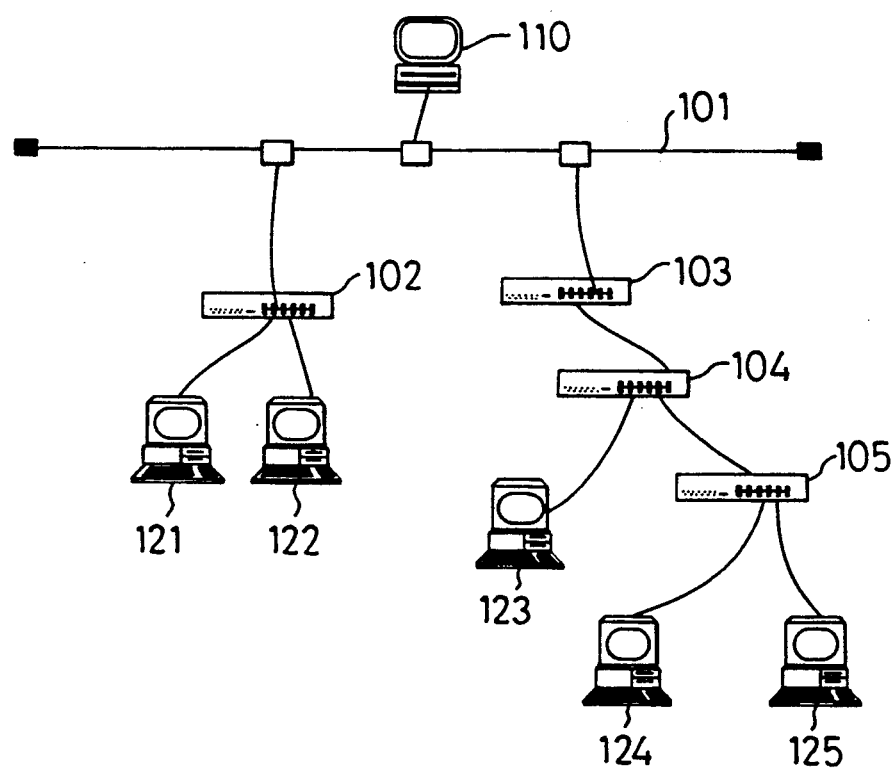
FIG. 13 shows in a schematic explanatory view another embodiment of the network administration system according to the present invention.
Figure 14:
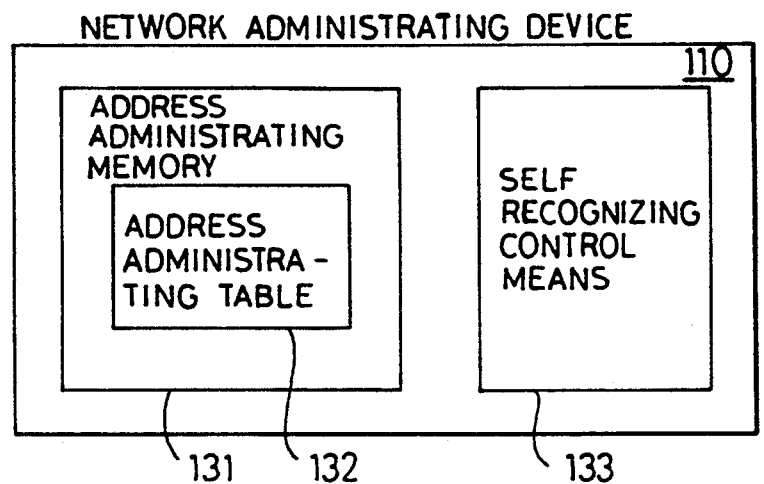
FIG. 14 is a block diagram showing an administrative terminal in the system of FIG. 13.

In FIGS. 13 and 14, there is shown another embodiment of the network administration system according to the present invention. While the cascade connection in FIG. 13 is slightly different from the one shown in the system of FIG. 1, the aspect of the cascade connection as well as the number of such repeaters as hubs should be widely variable and should not be specifically defined. In FIG. 13, further, there are shown practical terminal equipments 121 through 125 as connected to the respective master, sub and terminal hubs 102 through 105, but it is optional whether the terminal equipments are directly connected to the master and sub hubs or to lower level hubs, and any one of various aspects may be adopted as required. For the respective hubs 102-105 shown in FIG. 13, more practical references thereto shall be made followings below, including references to the constitution of the ports provided to the respective hubs. That is, the hubs 102-105 are provided respectively with a plurality of ports for the signal input and output, the terminal equipments 121 and 122 are directly connected to first and third ports of one of the master hubs 102 while the master hub 102 is connected at its second port to the transmission path 101 preferably through a transceiver. This second port of the master hub is called the upper level port while the first and third ports are called the lower level ports, and any other ports are made to be vacant ports. In the other master hub 103, on the other hand, first port is connected as the upper level port to the transmission path 101 while second port is connected as the lower level port to the sub hub 104, and all other ports are made to be vacant ports. At the sub hub 104, further, first and second ports are connected as the lower level ports to the terminal hub 105 and terminal equipment 123 while third port is connected as the upper level port to the master hub 103, and other ports are made vacant. First port of the terminal hub 105 is connected as the upper level port to the sub hub 104 while second and third ports are connected as the lower level ports to the terminal equipments 124 and 125, respectively.

These hubs 102-105 are capable of storing and administrating the sender address SA included in the packet received at their ports, and this address information is sent to the administrative terminal 110 within the network. This administrative terminal 110 is formed as shown in FIG. 14 to store the address information in an address administrating memory 131 and to administrate the information utilizing such address administrating table 132 as shown in following TABLES IV through VIII. Further, the address information may be modified in real time mode, and the address administrating memory 131 is so constituted as to administrate new information all the time. Further, the administrative terminal 110 also includes an automatic recognition controlling means 133, which reads the MAC address information sequentially out of the address administrating memory 131 in the administrative terminal 110, and the connection arrangement of the hubs is recognized in accordance with an optimum flow chart later described. The administrative terminal 110 is executing the network administration of the hubs 102-105, and the automatic recognition controlling means 133 is capable of recognizing the respective addresses H1-H4 of the hubs 102-105 and the address M of the administrative terminal 110. The MAC addresses of the respective equipments are as shown in following TABLE III:

TABLE III

| Equipments: | Adm. Term. | Hubs | | | | Term Equips. | | | | |
| --- | --- | --- | --- | --- | --- | --- | --- | --- | --- | --- |
| | 110 | 102 | 103 | 104 | 105 | 121 | 122 | 123 | 124 | 125 |
| MAC. Add.: | M | H1 | H2 | H3 | H4 | T1 | T2 | T3 | T4 | T5 |

Figure 15:
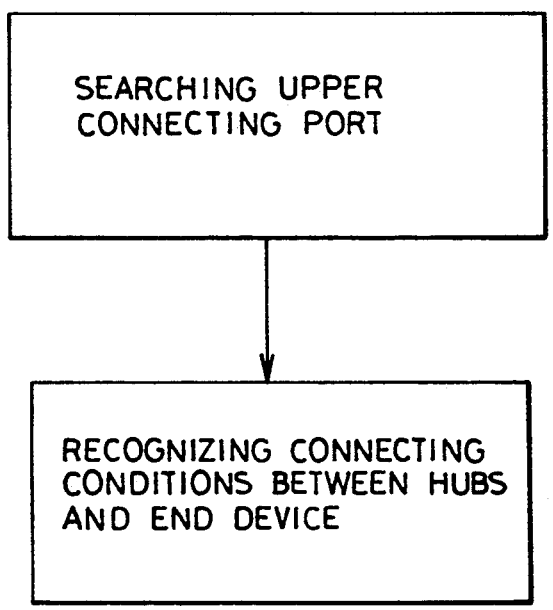
FIG. 15 is a flow chart of an explanatory view for an operation at administrative terminal in the system of FIG. 13.

References shall be made to an algorithm in which the automatic recognition controlling means 133 in the administrative terminal 110 recognizes automatically the hub connection arrangement with the information of the address administrating memory 131 employed. Here, FIG. 15 shows a main flow chart denoting the operation of the automatic recognition controlling means 133, which comprises a first processing step for searching the upper level port, and a second processing step for recognizing the connection arrangement between the respective hubs and the connection arrangement of the terminal equipments as well.

Figure 16:
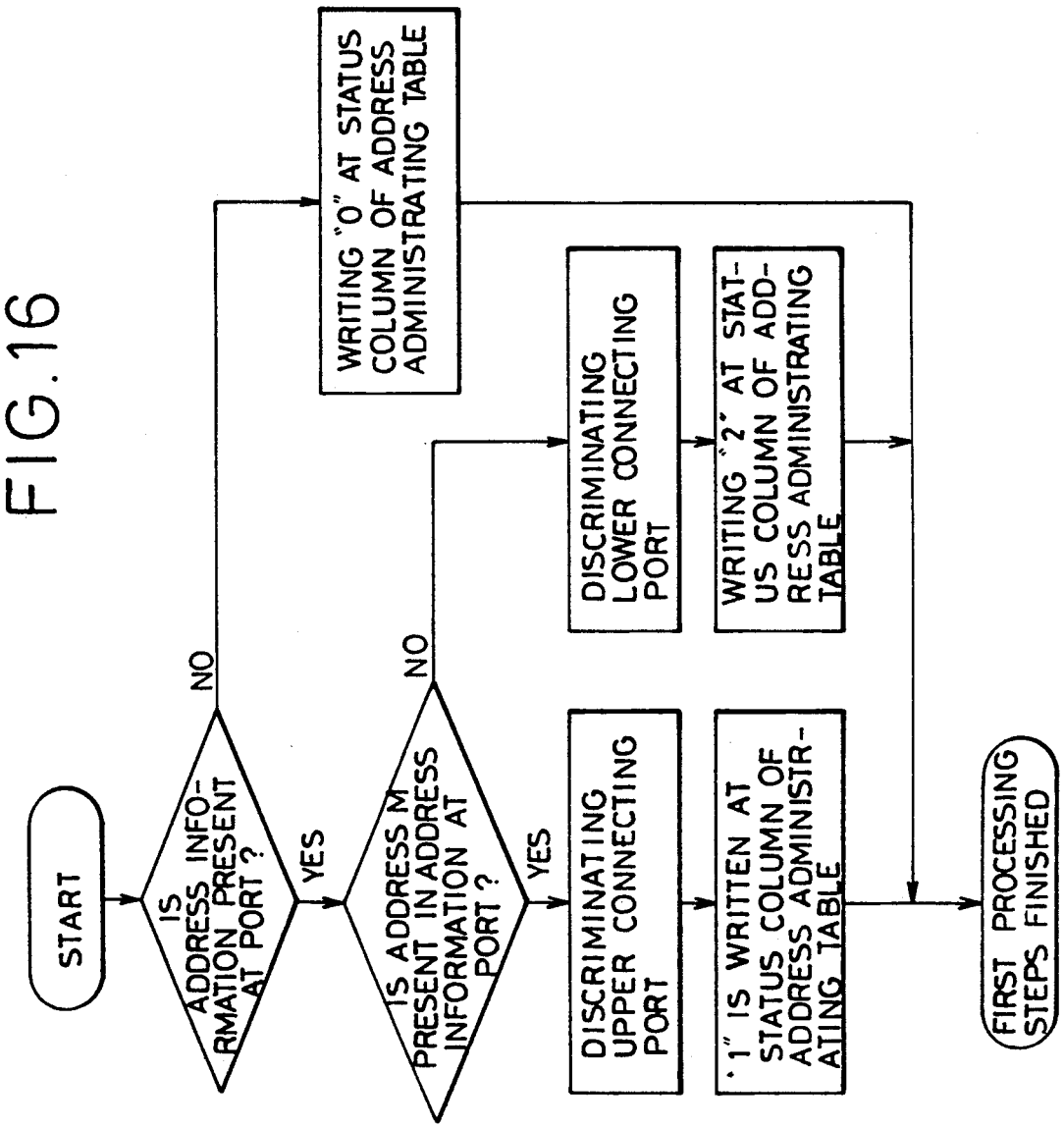
FIG. 16 is a flow chart of a first processing operation in the system of FIG. 13.

In FIG. 16, there is shown a detailed flow chart of the first processing step. In the present instance, it is first discriminated at the automatic recognition controlling means 133 whether or not the address information corresponding to the respective port numbers of the address administrating table 132 are present so that, provided that the address information at one port does not include the address M of the administrative terminal 110, this port is discriminated to be the lower level port of the corresponding hub, and "2" will be written in a status column in the address administrating table 132 such as shown in a following TABLE IV.

In the example of the connection arrangement shown in FIG. 13, the address M of the administrative terminal 110 is not included in the address information at the first port of the master hub 102, but the presence of the address T1 causes "2" to be written in the status column. Further, as the address M of the administrative terminal 110 is included in the address information at the second port of the master hub 102, there is written "1" in the status column. As no address is present in the address information at the second port of the hub 103, there is written "0" in the status column. A state of the address administrating table 132 upon termination of this first processing step is shown in a following TABLE V.

Figure 17:
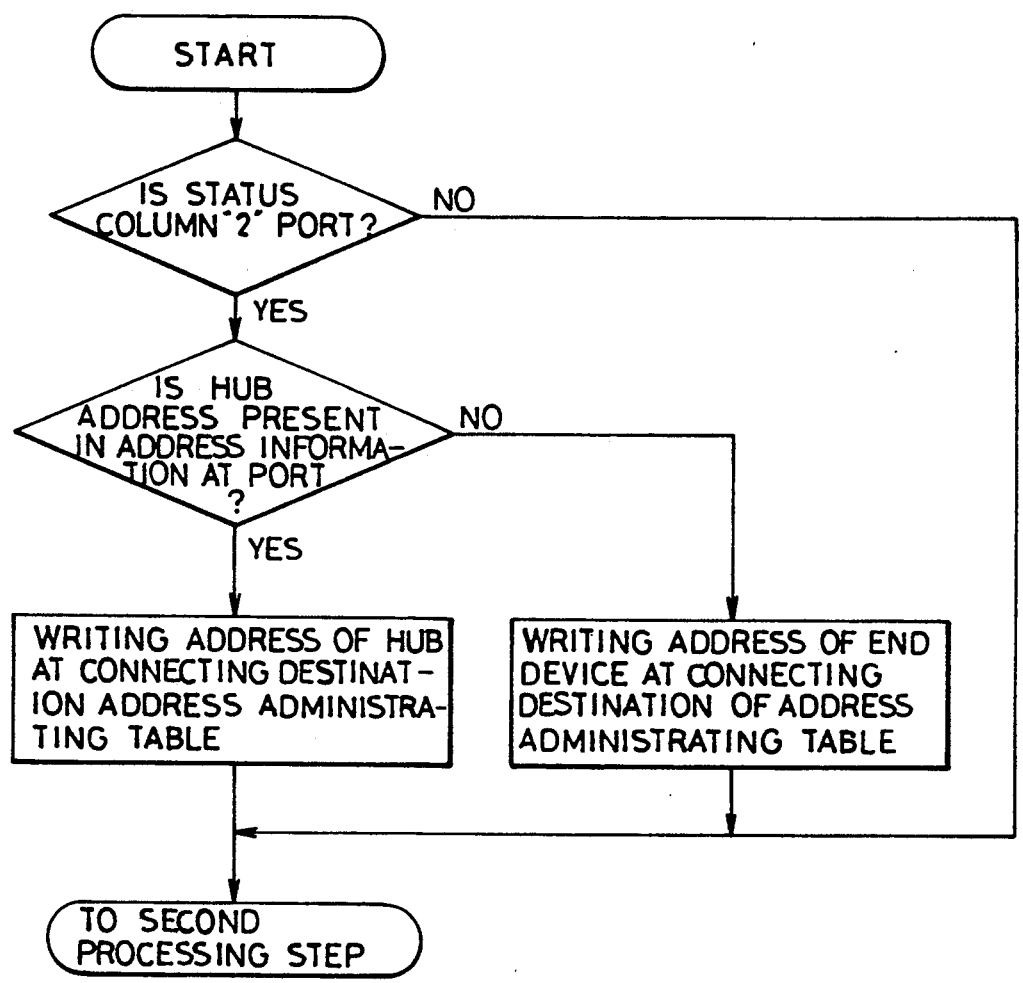
FIG. 17 is a flow chart of a second processing operation at a first step in the system of FIG. 13.
Figure 18:
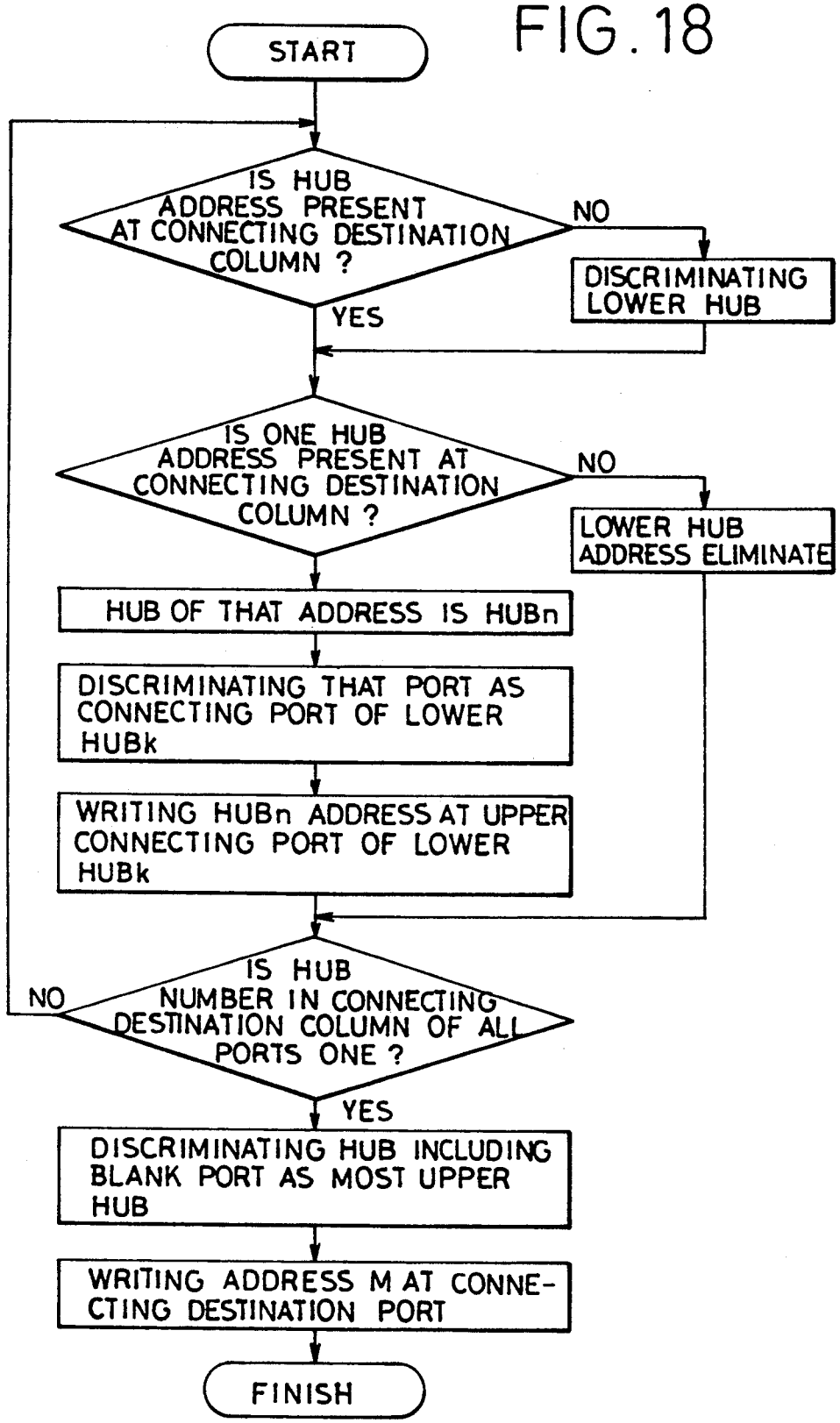
FIG. 18 is a flow chart of the second processing operation at a second step in the system of FIG. 13.

Next, a detailed flow chart of the second processing step is shown in FIGS. 17 and 18. In the present instance, the port address information on all of the hubs is sequentially read at the automatic recognition controlling means 133 so that the connection arrangement of the respective hubs will be recognized automatically. That is, when, at a first stage of the second processing step, the port involves in its address the address of the hub among the ports having "2" written in the status column of the address administrating table 132 as shown in FIG. 17, the address of such hub is written in the column to which the connection is made in the address administrating table 132. When on the other hand the ports having "2" written in the status column of the address administrating table 132 involves no address of the hub in their address, or in other words, only one of the addresses of the terminal equipments is present, the address of such terminal equipment is written in the column to which the connection is made. In a following TABLE VI, a state of the address administrating table 132 upon termination of the first stage of the second processing step is shown.

Next, at a second stage of the second processing step, it is discriminated whether or not the address of hub is present in the column to which the connection is made as shown in FIG. 18, so that the absence of the hub address will be determined as that the particular hub is of the lower level. Then, in other ports, the port having only one address of the lower level hub, for example, first port of the sub hub 104 is discriminated to be the connecting port of the lower level hub, and the address of the $hub_n$ is written in the upper level port of the lower level $hub_k$, for example, first port of the terminal hub 105. In a following TABLE VII, there is shown a state of the address administrating table 132 upon termination of the foregoing processing step. The foregoing processing steps are repeated, the last port remained when the number of the hubs in the column to which the connection of all ports is made has become one is discriminated to be the port of connection through transceiver, and the address M of the administrative terminal as the one to which the connection is made is written. In a following TABLE VIII, there is shown a state of the address administrating table 132 upon termination of the foregoing processing steps.

TABLE IV

| EQUIP. | PORT | ADDRESS INFORMATION | STATUS | CONNCT'D TO | CASCADE |
|---|---|---|---|---|---|
| HUB 102 | #1 | T1 | | | |
| | 2 | M,H2,H3,T3, H4,T4,T5 | | | |
| | 3 | T2 | | | |
| HUB 103 | #1 | M,H1,T1,T2 | | | |
| | 2 | — — — — | | | |
| | 3 | H3,T3,H4,T4,T5 | | | |
| HUB 104 | #1 | H4,T4,T5 | | | |
| | 2 | T3 | | | |
| | 3 | M,H2,H1,T1,T2 | | | |
| HUB 105 | #1 | M,H3,T3,H2,H1,T1,T2 | | | |
| | 2 | T4 | | | |
| | 3 | T5 | | | |

TABLE V

| EQUIP. | PORT | ADDRESS INFORMATION | STATUS | CONNCT'D TO | CASCADE |
|---|---|---|---|---|---|
| HUB 102 | #1 | T1 | 2 | | |
| | 2 | M,H2,H3,T3, H4,T4,T5 | 1 | | |
| | 3 | T2 | 2 | | |
| HUB 103 | #1 | M,H1,T1,T2 | 1 | | |
| | 2 | | 0 | | |
| | 3 | H3,T3,H4, T4, T5 | 2 | | |
| HUB 104 | #1 | H4,T4,T5 | 2 | | |
| | 2 | T3 | 2 | | |
| | 3 | M,H2,H1,T1, T2 | 1 | | |
| HUB 105 | #1 | M,H3,T3,H2, H1,T1,T2 | 1 | | |
| | 2 | T4 | 2 | | |
| | 3 | T5 | 2 | | |

TABLE VI

| EQUIP. | PORT | ADDRESS INFORMATION | STATUS | CONNCT'D TO | CASCADE |
|---|---|---|---|---|---|
| HUB 102 | #1 | T1 | 2 | T1 | |
| | 2 | M,H2,H3,T3,H4,T4,T5 | 1 | | |
| | 3 | T2 | 2 | T2 | |
| HUB 103 | #1 | M,H1,T1,T2 | 1 | | |
| | 2 | | 0 | | |
| | 3 | H3,T3,H4,T4,T5 | 2 | H3,H4 | |
| HUB 104 | #1 | H4,T4,T5 | 2 | H4 | |
| | 2 | T3 | 2 | T3 | |
| | 3 | M,H2,H1,T1,T2 | 1 | | |
| HUB 105 | #1 | M,H3,T3,H2,H1,T1,T2 | 1 | | |
| | 2 | T4 | 2 | T4 | |
| | 3 | T5 | 2 | T5 | |

TABLE VII

| EQUIP. | PORT | ADDRESS INFORMATION | STATUS | CONNCT'D TO | CASCADE |
|---|---|---|---|---|---|
| HUB 102 | #1 | T1 | 2 | T1 | |
| | 2 | M,H2,H3,T3,H4,T4,T5 | 1 | | |
| | 3 | T2 | 2 | T2 | 1 |
| HUB 103 | #1 | M,H1,T1,T2 | 1 | | |
| | 2 | ———— | 0 | — | |
| | 3 | H3,T3,H4,T4,T5 | 2 | | H3,H4 |
| HUB 104 | #1 | H4,T4,T5 | 2 | H4 | |
| | 2 | T3 | 2 | T3 | |
| | 3 | M,H2,H1,T1,T2 | 1 | | |
| HUB 105 | #1 | M,H3,T3,H2,H1,T1,T2 | 1 | H3 | |
| | 2 | T4 | 2 | T4 | |
| | 3 | T5 | 2 | T5 | 1 |

TABLE VIII

| EQUIP. | PORT | ADDRESS INFORMATION | STATUS | CONNCT'D TO | CASCADE |
|---|---|---|---|---|---|
| HUB 102 | #1 | T1 | 2 | T1 | |
| | 2 | M,H2,H3,T3,H4,T4,T5 | 1 | M | |
| | 3 | T2 | 2 | T2 | 1 |
| HUB 103 | #1 | M,H1,T1,T2 | 1 | M | |
| | 2 | ———— | 0 | — | |
| | 3 | H3,T3,H4,T4,T5 | 2 | H3 | 4 |
| HUB 104 | #1 | H4,T4,T5 | 2 | H4 | |
| | 2 | T3 | 2 | T3 | |
| | 3 | M,H2,H1,T1,T2 | 1 | H2 | 3 |
| HUB 105 | #1 | M,H3,T3,H2,H1,T1,T2 | 1 | H3 | |
| | 2 | T4 | 2 | T4 | |
| | 3 | T5 | 2 | T5 | 1 |

Figure 19:
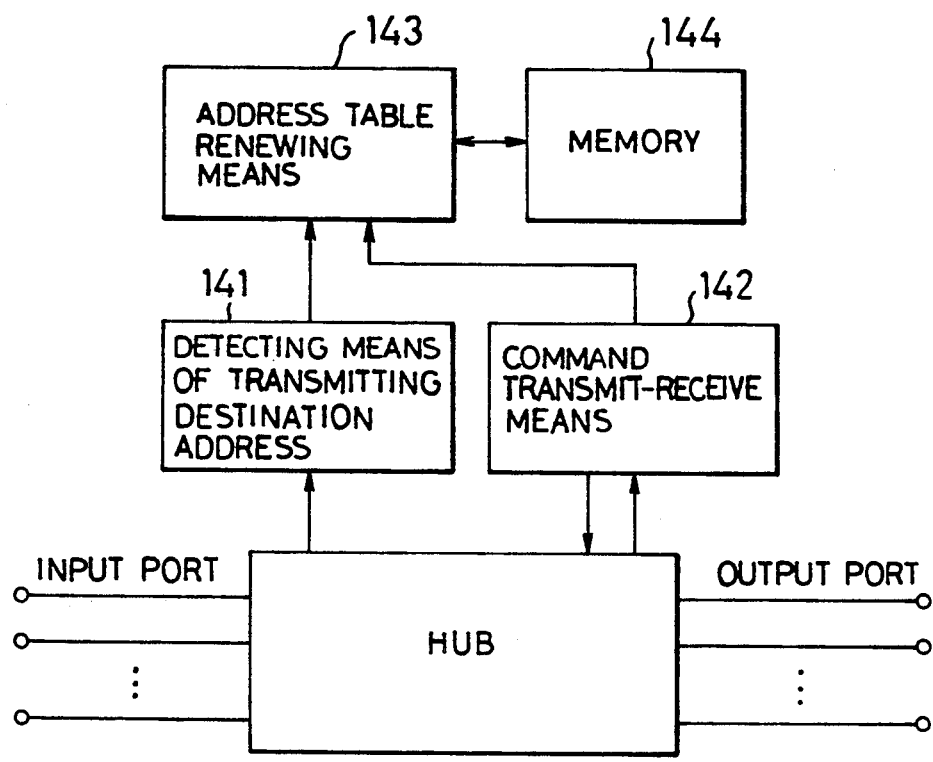
FIG. 19 is a schematic block diagram showing still another embodiment of the network administration system according to the present invention.
Figure 21:
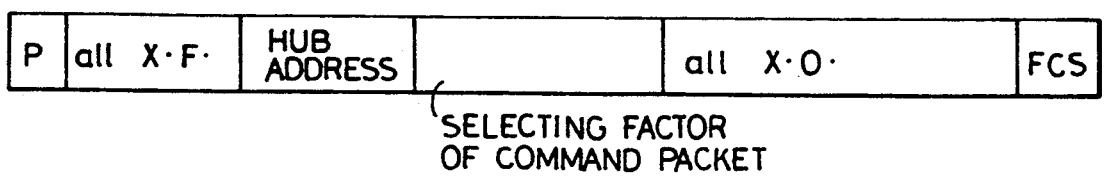
FIG. 21 is an explanatory view for an arrangement of a frame of a command packet in the system of FIG. 19.
Figure 23:
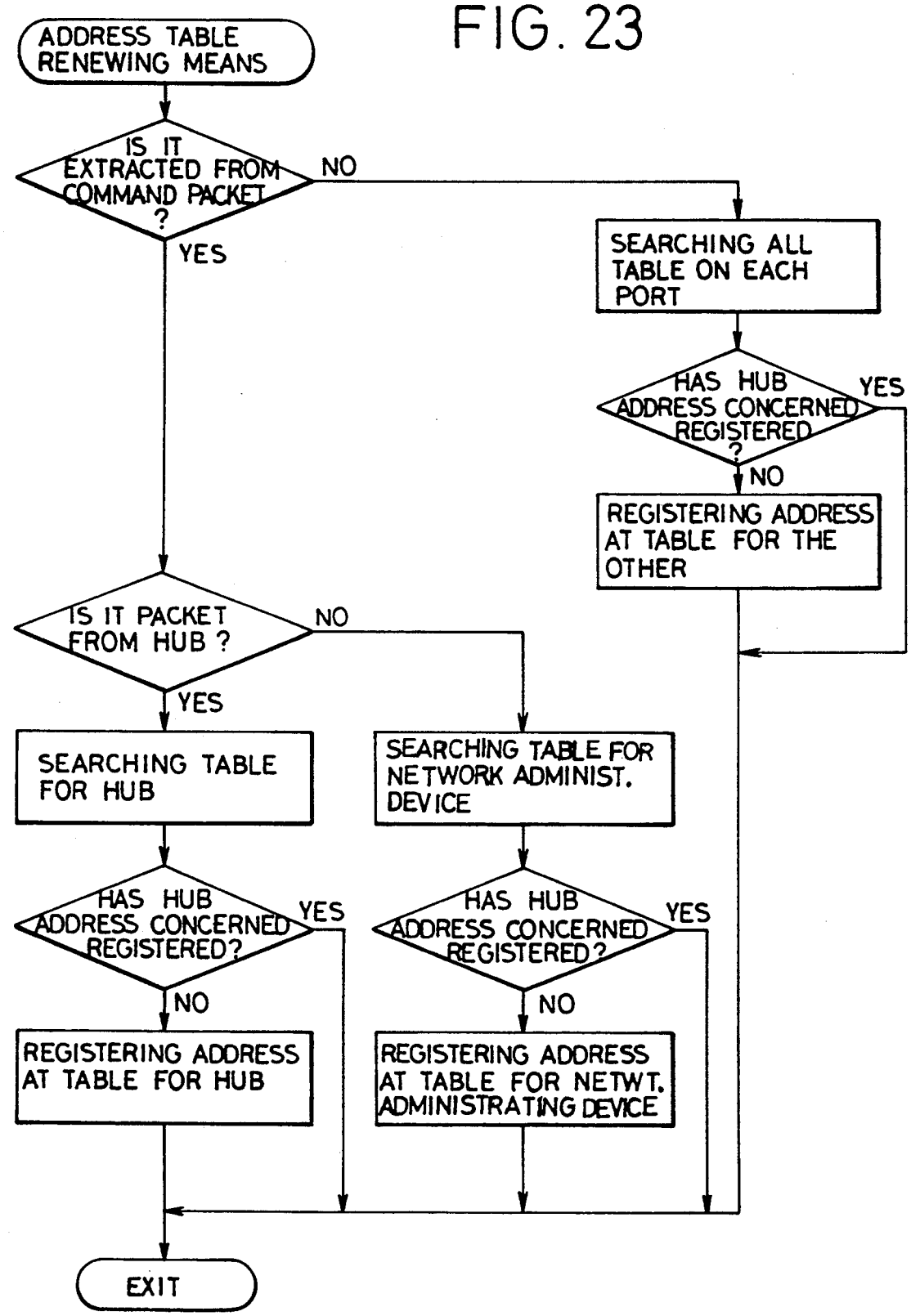
FIG. 23 is a flow chart of an address table renewing operation in the system of FIG. 19.

In such another working aspect of the network administration system according to the present invention as shown in FIG. 19, such repeater as hub is provided with a transmitted-address sender detecting means 141, a command transmitting and receiving means 142, an address table renewing means 143 and a memory 144. In the present instance, such command packet as shown in FIG. 21 and input into the hub is analyzed at the command transmitting and receiving means 142, the address of the hub is provided to the renewing means 143, and a registering operation is executed at the means 143 according to a flow chart shown in FIG. 23. At this address table renewing means 143, in particular, a recognition of absence of the input address within the table for the hub causes this input address to be registered in such table for the hub of port 2 as shown in FIG. 20. Other transmitted addresses are extracted by the transmitted-address sender detecting means 141 from the packet received through the port, and thus extracted addresses are provided to the address table renewing means 143. Upon recognition at this renewing means 143 of absence of these addresses in the table for the hub as the repeater and the administrative terminal, the addresses are registered in other tables shown in FIG. 20 of the port 2 than the foregoing table in the same manner.

Since the terminal equipment connected to each port is fundamentally single, other tables are provided respectively to each of the ports one by one so as to be able to store all the data with a lesser capacity. Further in the present case, any changes in the addresses from previously stored contents are counted up in respect of the number of the address changes, and newly extracted addresses are superscribed.

Figure 22:
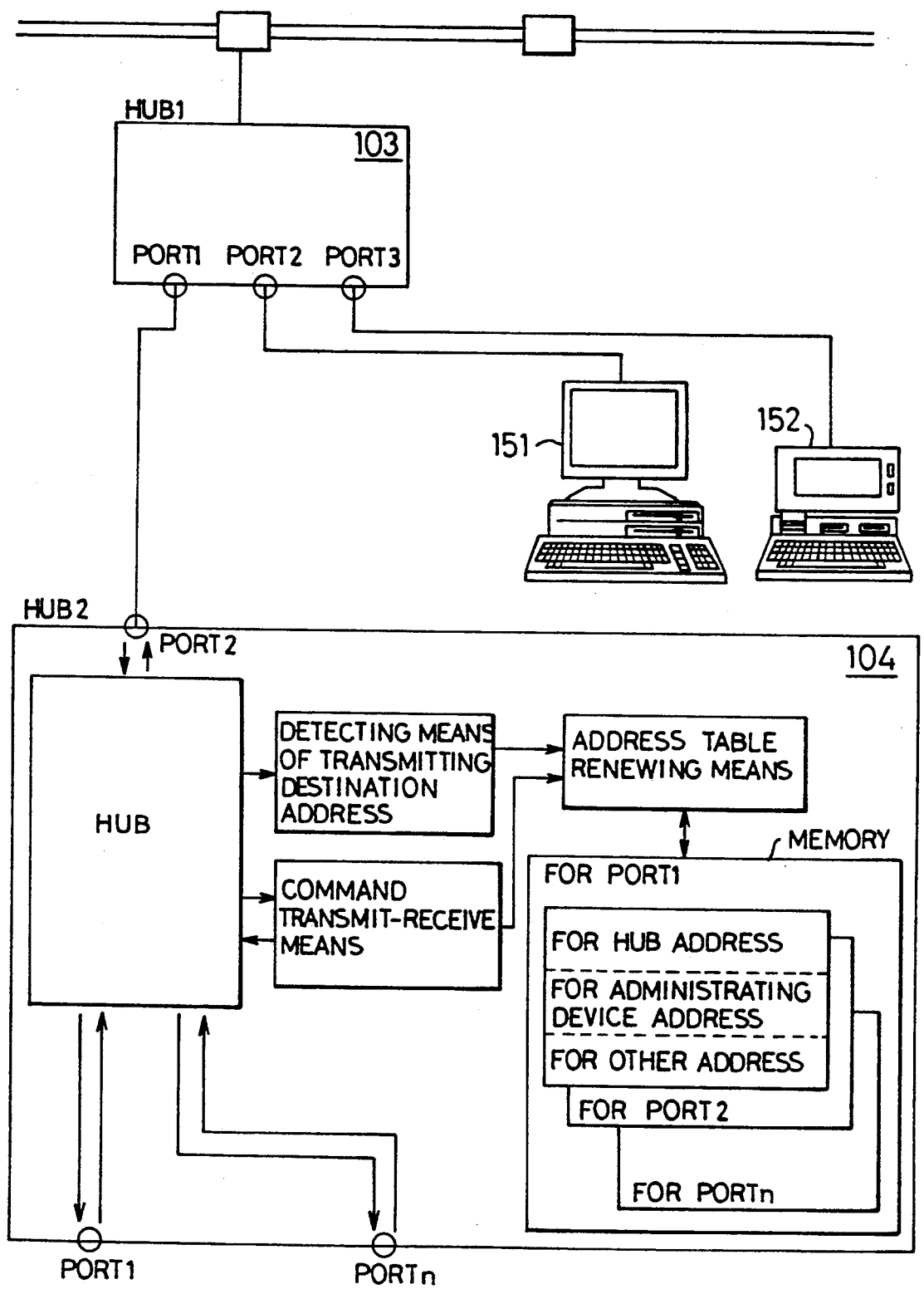
FIG. 22 is an explanatory view for working aspect to which the command packet in the system of FIG. 19 is applied.

The present working aspect can be effectively utilized in such mode as shown in FIG. 22, in which a sub hub 104 is connected to first port of the master hub 103 while the terminal equipments 151 and 152 are connected to the second and third ports of the master hub 103.

What is claimed is:

1. A network administration system comprising:
a network including a plurality of repeaters in a cascade connection;
a plurality of functioning terminal units connected to the plurality of repeaters;
an administrative terminal connected through a transmission path to a topmost one of the repeaters in the cascade connection;
a command packet forming means provided in said administrative terminal for forming a command packet to be transmitted through the transmission path to said network of repeaters for recognizing an actual connection arrangement of said repeaters and said terminal units;
means provided in respective ones of said repeaters for forming a return packet to be transmitted from one of the repeaters in response to the command packet received; and means provided in said administrative terminal for analyzing said return packet to recognize data contained in the return packet.

2. The system according to claim 1, which further includes means provided in said administrative terminal for automatically recognizing said connection arrangement of said repeaters and terminal units on the basis of a result of the analysis at said return packet analyzing means, and a table provided in the administrative terminal for registering the recognized connection arrangement of the repeaters.

3. The system according to claim 1, wherein each of said repeaters comprises a command packet analyzing means which discriminates whether or not said command packet received is an administrative command to the particular repeater and searches a command packet address in a data part of the command packet, and means for adding an address of the particular repeater to a terminating end of actual input data to the particular repeater to form the return packet in response to the command packet addressed to the particular repeater and for transmitting the return packet to said administrative terminal while passing the command packet not addressed to the particular repeater over to other repeaters or terminal units in said network.

4. The system according to claim 2, wherein said means for automatically recognizing the connection arrangement detects an address of one of said repeaters which has transmitted the return packet received from said network and executes a recognizing operation on the basis of contents in an address administrating memory provided in said administrative terminal for storing detected information.

5. The system according to claim 1, wherein each of the repeaters include means for detecting an address of the repeater which has transmitted the return packet through a first port of the repeater, and a memory for storing a connection of another repeater to a second port of the repeater.

6. The system according to claim 5, wherein said memory in the repeaters is provided for storing the address of the repeater which transmits the return packet, respective addressed of the other repeaters, and an address of said administrative terminal, at mutually different portions in memory.

* * * * *